United States Patent
Sawhney et al.

(10) Patent No.: US 10,664,309 B2
(45) Date of Patent: May 26, 2020

(54) USE OF CONCURRENT TIME BUCKET GENERATIONS FOR SCALABLE SCHEDULING OF OPERATIONS IN A COMPUTER SYSTEM

(71) Applicant: Oracle International Corporation, Redwood Shores, CA (US)

(72) Inventors: Aditya Sawhney, Erie, CO (US); Christopher Fagiani, Amherst, NY (US)

(73) Assignee: Oracle International Corporation, Redwood Shores, CA (US)

( * ) Notice: Subject to any disclaimer, the term of this patent is extended or adjusted under 35 U.S.C. 154(b) by 3 days.

(21) Appl. No.: 16/200,854

(22) Filed: Nov. 27, 2018

(65) Prior Publication Data

US 2019/0095248 A1   Mar. 28, 2019

Related U.S. Application Data

(63) Continuation of application No. 15/338,935, filed on Oct. 31, 2016, now Pat. No. 10,169,081.

(51) Int. Cl.
*G06F 9/48* (2006.01)
*G06F 9/50* (2006.01)
*G06F 3/0484* (2013.01)
*G06F 16/22* (2019.01)
*G06F 3/06* (2006.01)

(52) U.S. Cl.
CPC ........ *G06F 9/4881* (2013.01); *G06F 16/2272* (2019.01); *G06F 3/0484* (2013.01); *G06F 3/067* (2013.01); *G06F 9/50* (2013.01); *Y10S 707/99945* (2013.01)

(58) Field of Classification Search
None
See application file for complete search history.

(56) References Cited

U.S. PATENT DOCUMENTS

| 5,544,347 | A |   | 8/1996  | Yanai et al. |
|-----------|---|---|---------|--------------|
| 5,657,453 | A | * | 8/1997  | Taoka ............ G05B 19/41865 705/1.1 |
| 6,108,748 | A |   | 8/2000  | Ofek et al. |
| 6,157,612 | A |   | 12/2000 | Weerackody et al. |
| 6,460,052 | B1 |  | 10/2002 | Thomas et al. |
| 6,714,553 | B1 |  | 3/2004  | Poole et al. |
| 7,035,971 | B1 |  | 4/2006  | Merchant |

(Continued)

FOREIGN PATENT DOCUMENTS

| JP | 3208236 B2 | * | 9/2001 | ............... A23G 9/52 |
| KR | 10-2015-0088531 A | | 8/2015 | |
| KR | 20150088531 A | * | 8/2015 | |

OTHER PUBLICATIONS

Silberschatz et al. "Operating System Concepts, 8th Edition". John Wiley & Sons. Jul. 29, 2008. ISBN-13: 978-0-470-12872-5. Accessed Aug. 2019. (Year: 2008).

*Primary Examiner* — Abu Zar Ghaffari
(74) *Attorney, Agent, or Firm* — Invoke

(57) ABSTRACT

Concurrent processing of objects is scheduled using time buckets of different time bucket generations. A time bucket generation includes a configuration for time buckets associated with that time bucket generation. The concurrent use of different time bucket generations includes the concurrent processing of objects referenced by time buckets of different time bucket generations.

19 Claims, 5 Drawing Sheets

(56) References Cited

U.S. PATENT DOCUMENTS

| | | | |
|---|---|---|---|
| 7,245,624 B2 * | 7/2007 | Kramer | H04L 47/22 370/395.4 |
| 7,263,593 B2 | 8/2007 | Honda et al. | |
| 7,707,151 B1 | 4/2010 | Blumenau et al. | |
| 8,484,162 B2 | 7/2013 | Prahlad et al. | |
| 8,521,973 B2 | 8/2013 | Rowan et al. | |
| 8,627,319 B1 * | 1/2014 | Xu | G06F 9/4887 718/100 |
| 8,645,737 B2 | 2/2014 | Saika | |
| 8,973,034 B1 | 3/2015 | Harvey et al. | |
| 9,037,538 B2 | 5/2015 | Sampathkumar | |
| 9,396,287 B1 | 7/2016 | Bhave et al. | |
| 9,501,507 B1 | 11/2016 | Harris et al. | |
| 9,507,843 B1 | 11/2016 | Madhavarapu et al. | |
| 9,524,302 B2 | 12/2016 | Regni et al. | |
| 9,547,459 B1 | 1/2017 | Benhanokh et al. | |
| 9,720,989 B2 | 8/2017 | Theimer et al. | |
| 9,740,565 B1 | 8/2017 | Mitra et al. | |
| 9,798,754 B1 | 10/2017 | Shilane et al. | |
| 9,811,529 B1 | 11/2017 | Rus et al. | |
| 9,846,655 B1 | 12/2017 | Zhao et al. | |
| 9,864,774 B2 | 1/2018 | Marcotte | |
| 10,229,150 B2 * | 3/2019 | Marquardt | G06F 16/2343 |
| 10,346,360 B1 | 7/2019 | Basov | |
| 2001/0016843 A1 | 8/2001 | Olson et al. | |
| 2002/0143494 A1 | 10/2002 | Conrad | |
| 2004/0153458 A1 | 8/2004 | Noble et al. | |
| 2005/0049945 A1 | 3/2005 | Bourbonnais et al. | |
| 2005/0131964 A1 | 6/2005 | Saxena | |
| 2006/0072400 A1 | 4/2006 | Anderson et al. | |
| 2006/0095481 A1 | 5/2006 | Singh et al. | |
| 2006/0106825 A1 * | 5/2006 | Cozzi | G06F 16/288 |
| 2006/0218558 A1 | 9/2006 | Torii et al. | |
| 2006/0271420 A1 | 11/2006 | Anselmann et al. | |
| 2007/0043790 A1 | 2/2007 | Kryger | |
| 2007/0192229 A1 | 8/2007 | Rowan | |
| 2007/0239944 A1 | 10/2007 | Rupanagunta et al. | |
| 2009/0059017 A1 * | 3/2009 | Kurokawa | H04N 5/145 348/208.1 |
| 2010/0049938 A1 * | 2/2010 | Izumi | G06F 12/0253 711/170 |
| 2010/0205160 A1 | 8/2010 | Kumar et al. | |
| 2010/0257995 A1 | 10/2010 | Kamiya | |
| 2010/0322475 A1 | 12/2010 | Ikeda | |
| 2011/0013631 A1 | 1/2011 | Frydman et al. | |
| 2011/0016353 A1 | 1/2011 | Mikesell et al. | |
| 2011/0119100 A1 | 5/2011 | Ruhl et al. | |
| 2011/0164614 A1 | 7/2011 | Begeja | |
| 2011/0196900 A1 | 8/2011 | Drobychev et al. | |
| 2011/0246429 A1 | 10/2011 | Prahlad et al. | |
| 2011/0298520 A1 * | 12/2011 | Masson | G01S 7/2926 327/337 |
| 2012/0072412 A1 | 3/2012 | Bestgen et al. | |
| 2012/0191724 A1 * | 7/2012 | Tucek | G06F 16/27 707/747 |
| 2012/0254116 A1 | 10/2012 | Thereska et al. | |
| 2012/0259863 A1 | 10/2012 | Bodwin et al. | |
| 2012/0311586 A1 | 12/2012 | Inagaki | |
| 2013/0290249 A1 | 10/2013 | Merriman et al. | |
| 2013/0311422 A1 | 11/2013 | Walker et al. | |
| 2013/0311555 A1 | 11/2013 | Laoutaris et al. | |
| 2013/0326055 A1 | 12/2013 | Chatterjee et al. | |
| 2014/0040199 A1 | 2/2014 | Golab et al. | |
| 2014/0122022 A1 | 5/2014 | Chen et al. | |
| 2014/0180461 A1 | 6/2014 | Heck et al. | |
| 2014/0189270 A1 | 7/2014 | Iwanicki et al. | |
| 2014/0207820 A1 * | 7/2014 | Lee | G06F 16/2465 707/776 |
| 2014/0280986 A1 | 9/2014 | Baulier et al. | |
| 2015/0112836 A1 | 4/2015 | Godsey et al. | |
| 2015/0220558 A1 | 8/2015 | Snibbe et al. | |
| 2015/0234897 A1 | 8/2015 | Kuninobu et al. | |
| 2015/0278092 A1 | 10/2015 | Smentek et al. | |
| 2015/0302432 A1 * | 10/2015 | Chien | G06Q 30/0202 705/7.31 |
| 2015/0339314 A1 | 11/2015 | Collins et al. | |
| 2015/0355824 A1 | 12/2015 | Ueno | |
| 2015/0363271 A1 | 12/2015 | Haustein et al. | |
| 2015/0370505 A1 | 12/2015 | Shuma et al. | |
| 2016/0006673 A1 | 1/2016 | Thomas et al. | |
| 2016/0026409 A1 | 1/2016 | Tanaka et al. | |
| 2016/0105370 A1 | 4/2016 | Mellor et al. | |
| 2016/0202693 A1 | 7/2016 | Noda et al. | |
| 2016/0255139 A1 * | 9/2016 | Rathod | H04L 67/10 709/203 |
| 2016/0275150 A1 | 9/2016 | Bournonnais et al. | |
| 2016/0306822 A1 | 10/2016 | Waghulde | |
| 2016/0335550 A1 | 11/2016 | Achin et al. | |
| 2016/0342486 A1 | 11/2016 | Kedem et al. | |
| 2017/0052717 A1 | 2/2017 | Rawat et al. | |
| 2017/0351543 A1 | 12/2017 | Kimura | |
| 2017/0371887 A1 | 12/2017 | Balasubramanian et al. | |
| 2018/0075069 A1 | 3/2018 | Guim et al. | |

* cited by examiner

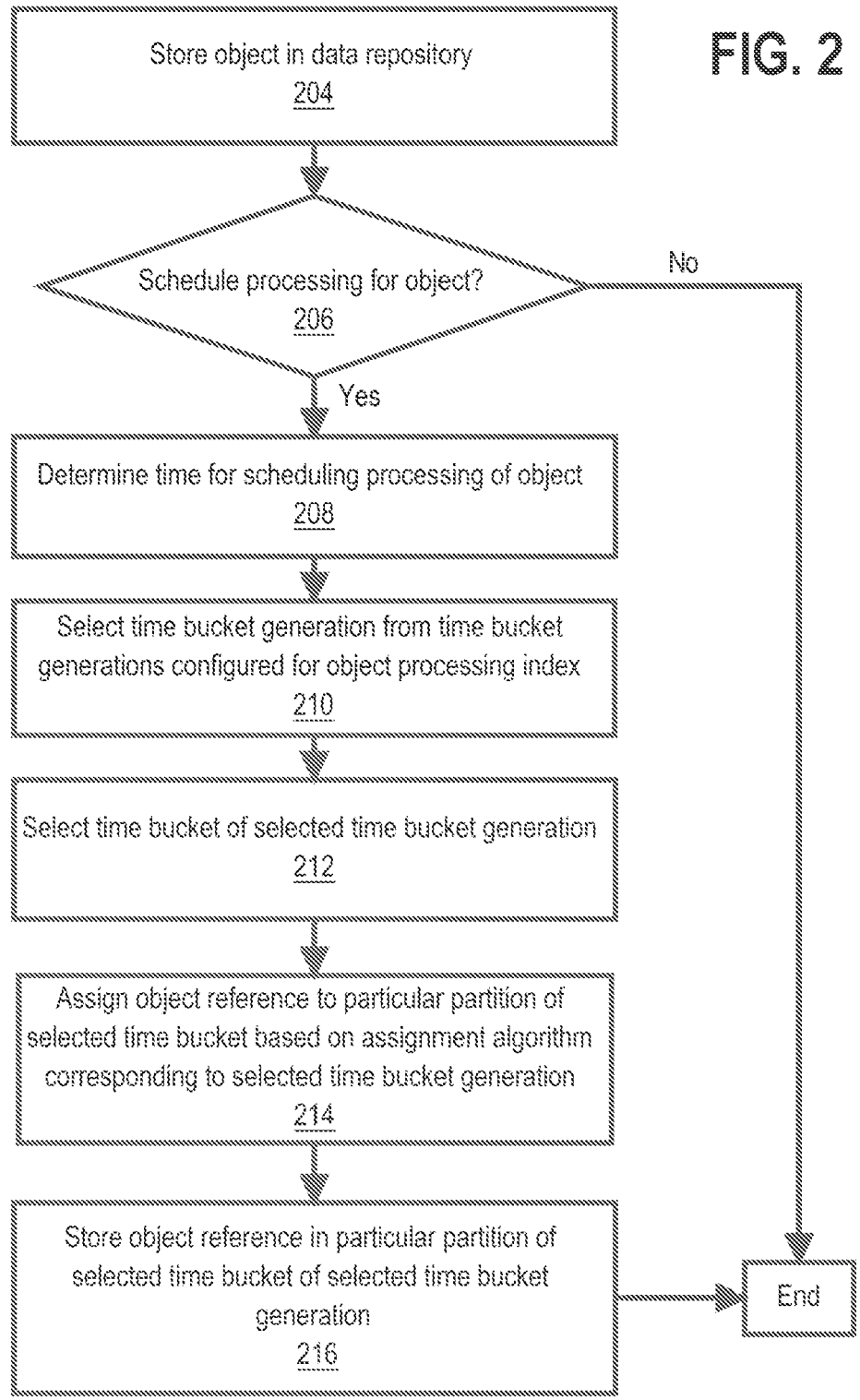

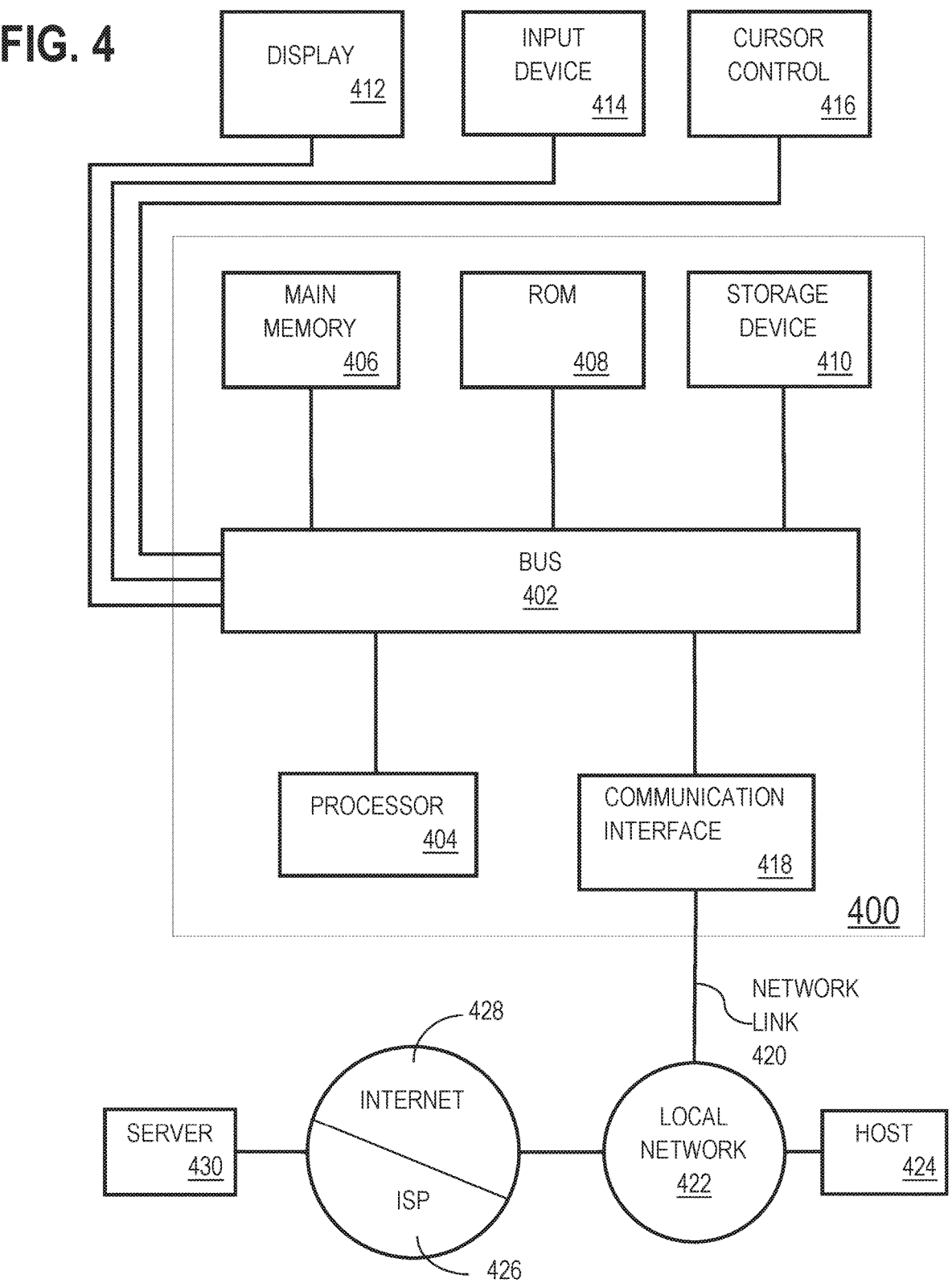

USE OF CONCURRENT TIME BUCKET GENERATIONS FOR SCALABLE SCHEDULING OF OPERATIONS IN A COMPUTER SYSTEM

INCORPORATION BY REFERENCE; DISCLAIMER

The following application is hereby incorporated by reference: application Ser. No. 15/338,935 filed on Oct. 31, 2016. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to an object processing framework. In particular, the present disclosure relates to an object processing framework that concurrently uses different generations of time buckets for maintaining references to objects to-be-processed.

BACKGROUND

Storage systems store objects in accordance with various corresponding storage architectures. Examples of storage architectures include an object storage, a file system, a block storage, and/or a database. Various types of storage architectures may be implemented for cloud storage or local storage.

Each object within a storage architecture may be associated with data and metadata. Data (also referred to herein as "object data") includes, for example, information that is used by an end user and/or a business application. As an example, data for a Sales Application may include information about customers, products, and sales. As another example, data for a Human Resources Application may include information about employees, departments, and salaries.

Metadata (also referred to herein as "object metadata") describes how the data is set up and/or stored. Metadata describes characteristics about the data itself. Metadata may be used to manipulate and/or manage the objects in a storage system. Metadata may indicate, for example, a time at which the object is to be processed. The metadata may specify a time at which a corresponding object is to be deleted, synchronized with other versions of the object, modified, moved to secondary storage, or otherwise processed. The metadata may specify an exact time (e.g., 5 pm) or a time period (e.g., any time after 5 pm, or any time between 5 pm and 7 pm) for processing the object.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates operations for storing references to objects in an object processing index in accordance with one or more embodiments;

FIG. 4 illustrates a block diagram of a system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. OBJECT PROCESSING FRAMEWORK
3. CONCURRENTLY USING MULTIPLE TIME BUCKET GENERATIONS FOR SCHEDULING AND PERFORMING THE PROCESSING OF OBJECTS
4. PROCESSING OBJECTS SCHEDULED WITH ANY OF MULTIPLE TIME BUCKET GENERATIONS
5. MISCELLANEOUS; EXTENSIONS
6. HARDWARE OVERVIEW

1. General Overview

One or more embodiments include scheduling the processing of objects by concurrently using time buckets of different time bucket generations. A time bucket is a grouping of object references. A time bucket corresponds to a particular time period. As an example, a time bucket corresponds to a one hour time period from 8 am to 9 am on Oct. 25, 2016. An object processor processes an object, referenced by a particular time bucket, at the time period corresponding to the particular time bucket. A time bucket generation includes a configuration for time buckets associated with that time bucket generation. A time bucket generation may define one or more of: (a) a time period interval size of a time bucket, (b) a number of partitions or sections within a time bucket, and (c) an assignment algorithm for assigning an object reference to one of the partitions within a time bucket. The concurrent use of different time bucket generations includes the concurrent processing of objects referenced by time buckets of different time bucket generations.

In an embodiment, multiple different object processors concurrently process objects referenced by a single time bucket. Objects references may be assigned to one of a set of partitions for the time bucket. An object processing framework assigns a partition to an object processor for processing objects referenced by that partition. In at least one embodiment, multiple partitions may be assigned to a single object processor. However, multiple object processors may not be assigned to a single partition.

One or more embodiments described in this Specification and/or recited in the claims may not be included in this General Overview section.

2. Object Processing Framework

Figure 1A:
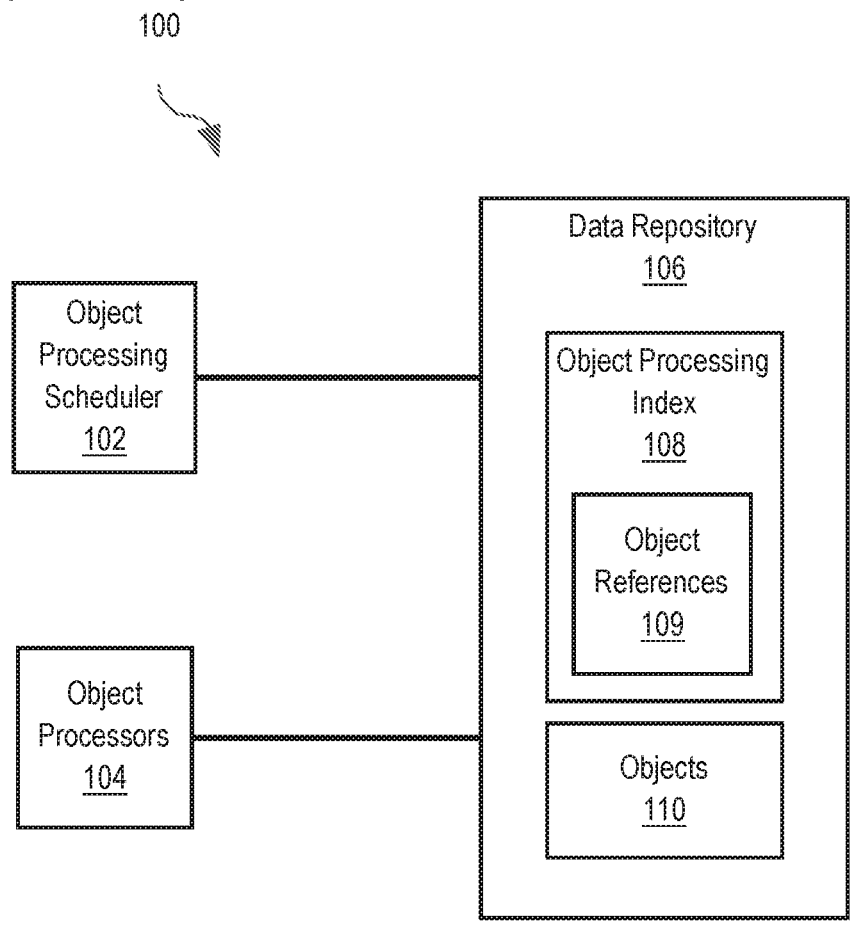
FIGS. 1A and 1B illustrate an object processing framework, in accordance with one or more embodiments.

FIG. 1A illustrates an object processing framework 100 in accordance with one or more embodiments. An object processing framework 100 schedules and executes the processing of objects with a database. As illustrated in FIG. 1, the object processing framework 100 includes an object processing scheduler 102, object processors 104, and a data repository 106. In one or more embodiments, the object processing framework 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, the data repository 106 is any type of storage unit and/or device (e.g., a file system, database, collection of tables, or any other storage mechanism) for storing data. Further, the data repository 106 may include multiple different storage units and/or devices. The multiple different storage units and/or devices may or may not be of the same type or located at the same physical site. Furthermore, the data repository 106 may be implemented or may execute on the same computing system as the object processing scheduler 102 and the object processors 104. Alternatively or additionally, the data repository 106 may be implemented or executed on a computing system separate from the object processing scheduler 102 and the object processors 104. The data repository 106 may be communicatively coupled to the object processing scheduler 102 or object processors 104 via a direct connection or via a network.

In an embodiment, the data repository 106 includes objects (e.g., objects 110). An object may be stored in contiguous memory locations or non-contiguous memory locations of the data repository 106. As an example, an object may include multiple portions such as data and metadata, as described above. The data and metadata may be stored together in contiguous memory locations. Alternatively, the data may be stored in data tier and the metadata may be stored in a separate metadata tier. The data tier and the metadata tier may be implemented on the same device or on different devices. Furthermore, the data corresponding to an object may itself by stored in contiguous memory locations or separate non-contiguous memory locations within the data tier.

Figure 1B:
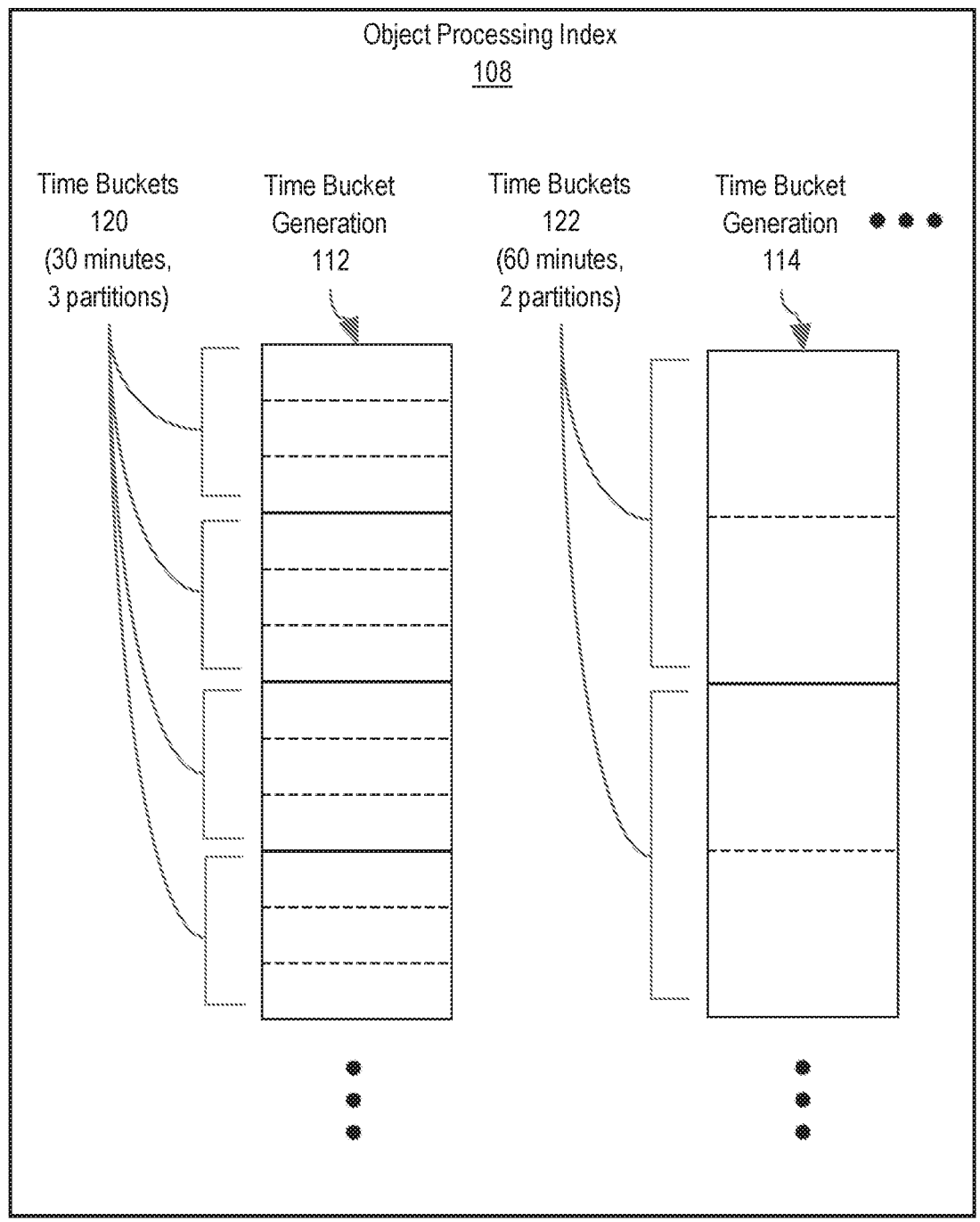

In an embodiment, the data repository 106 includes an object processing index 108 as illustrated in both FIGS. 1A and 1B. The object processing index 108 is an index of object references 109. The object references 109 refer to and identify objects 110 that are to be processed at a particular time (e.g., an exact time or a time period).

In an embodiment, object references 109, stored within the object processing index 108, may be stored with information identifying a type of processing to be performed. As an example, one object reference may be stored with information indicating that a corresponding object is to be deleted. Another object reference may be stored with information indicating that a corresponding object is to be transferred from a current data tier (e.g., primary data tier) to a different data tier (e.g., a secondary data tier).

In an embodiment, different object processing indices 108 are implemented for different types of processing to be performed. As an example, all objects referenced one object processing index are to be deleted. All objects referenced by another object processing index are to moved from a current data tier (e.g., primary data tier) to a different data tier (e.g., a secondary data tier).

In an embodiment, the object processing index 108 maintains time buckets (e.g., time buckets 120 and time buckets 122). A time bucket is a grouping of object references 109. A time bucket is associated with a time period (interchangeably referred to herein as a "time interval"). As an example, a time bucket may be associated with a time interval from 10 am to 10:30 am on Nov. 5, 2016 or a time interval from 2 pm to 3 pm on Nov. 6, 2016. Object references 109, within a particular time bucket, reference objects 110 that are to be processed during the time interval corresponding to the particular time bucket.

In an embodiment, a group of object references 109 within a time bucket may be further divided into sub-groups of object references 109. As an example, the particular time bucket is divided into three partitions (or sections). Each partition includes a corresponding sub-group of object references 109 of the group of object references 109 corresponding to the particular time bucket. Each partition may be assigned to an object processor 104, as further described below. An object processor 104, assigned to a particular partition of a time bucket, processes the objects 110 referenced by the object references 109 within the particular partition. Different object processors 104 may be assigned to different partitions within a same time bucket.

In an embodiment, time buckets within the object processing index 108 are associated with a corresponding time bucket generation. A time bucket generation may define one or more of: (a) an interval size of a time bucket, (b) a number of partitions or sections within a time bucket, and (c) an assignment algorithm for assigning an object reference to one of the partitions within a time bucket.

FIG. 1B illustrates an example with two time bucket generations: time bucket generation 112 and time bucket generation 114. As understood by a person skilled in the art, any number of time bucket generations may be configured for the object processing index 108. Time bucket generation 112 includes time buckets 120. Time buckets 120 of time bucket generation 112 have 30 minute intervals, each with 3 partitions. Time buckets 122 of time bucket generation 114 have 60 minute intervals, each with 2 partitions.

An optimal configuration for time buckets may change as a system scales up or scales down. As an example, as an average number of objects, to be processed within each period of time, increases or decreases, the configuration of time buckets may be modified for optimizing performance. Modifying the time buckets may include adding new time bucket generations defining configurations for corresponding time buckets. The new time bucket generations may be used concurrently with previously defined time bucket generations. As another example, different time bucket generations may be concurrently implemented for referencing different types of processing operations or different types of data.

Returning to FIG. 1A, an object processing scheduler 102 includes one or more software and/or hardware components used for scheduling the processing of objects 110. The object processing scheduler 102 may include functionality to determine how and when an object is to be processed. The object processing scheduler 102 may analyze information about Object Mutation Events (OMEs) published by a component of a storage system to determine how and when to process an object. OME information may specify that an object has been added to a container, deleted from a container, moved, or modified. OME information may further specify how and when the object is to be processed at a future time. The object processing scheduler 102 may analyze policies corresponding to a container, which includes the object, to determine how and when to process the object. The policies may explicitly indicate how and when objects within the container are to be processed. The object processing scheduler 102 may receive explicit instructions from any component of a storage system (or other system) which specify how and when an object is to be processed. The object processing scheduler 102 may use a single method or multiple techniques in combination to determine how and when to process an object.

In an embodiment, the object processing scheduler 102 may include functionality to schedule the processing of an object 110. The object processing scheduler 102 schedules the processing of an object 110 by adding a reference to the object 100 (referred to herein as an "object reference") to a data processing index 108. As an example, an object that is to be processed any time after 5:55 pm may be scheduled to a time bucket corresponding to a time interval that begins after 5:55 pm. The first time interval, corresponding to a time bucket and beginning after 5:55 pm may be a particular time interval from 6 pm to 7 pm. An object reference, referring to the object, is added to the time bucket corresponding to the time interval from 6 pm to 7 pm. Adding the object reference to the time bucket corresponding to the time interval from 6 pm to 7 pm later results in processing of the object between 6 pm and 7 pm.

In an embodiment, an object processor 104 includes functionality to process objects 110. Processing of an object may include the object processor 104 performing any operation related to the object. Examples of processing an object include, but are not limited to deleting the object, modifying the object, moving the object, synchronizing the object other objects, and synchronizing other objects to the object. An object processor 104 may be assigned to one or more partitions of one or more time buckets in the object processing index 108. An object processor 104 processes the objects referenced by the partitions that are assigned to that object processor 104. As an example, an object processor is assigned the first of three partitions in a particular time bucket corresponding to an interval of 6 pm to 7 pm on Oct. 21, 2016. During the time period 6 pm to 7 pm on Oct. 21, 2016, the object processor processes objects referenced by object references in the first partition of the particular time bucket. The objects referenced by the remaining two partitions of the particular time bucket may be processed by other object processors that are assigned to the remaining two partitions, respectively. Alternatively, a single object processor, may be assigned to two of the three partitions, or to all three partitions.

In an embodiment, an object processor 104 includes functionality to store a system state and resume from the system state. A system state may include a state of one or more components of the object processing framework. For example, a system state may include a state of an object processing index 108 and/or a state of objects referenced by the object processing index 108. An object processor 104, that process objects referenced by the object processing index 108, may periodically save a system state in a persistent manner. The object processor 104 may store the system state every x minutes or after processing every n objects. A system state stored in a persistent manner is independent of any failure or error associated with the object processor 104. A stored system state may be referred to as a "checkpoint" saved by the object processor 104. After an error, failure, or restart, an object processor may resume the processing of objects using an image of the stored system state. As an example, the object processor may store the system state after processing every fifty objects. After processing a $400^{th}$ object referenced by a particular time bucket, the object processor stores a system state. Subsequent to storing the system state, the object processor processes another twenty-five objects (processes objects 401-425). The object processor then crashes due to an error. When the object processor is restarted, the object processor resumes processing of objects from the saved state that was stored after processing of the $400^{th}$ object. Specifically, the object processor resumes processing of objects, starting with the $401^{st}$ object. The above example is simplified for purposes of explanation. A person skilled in the art will understand that the object processor may store the system state after processing any n number of objects (e.g., every fifty thousand objects instead of after processing every fifty objects).

3. Concurrently Using Multiple Time Bucket Generations for Scheduling and Performing the Processing of Objects FIG. 2 illustrates an example set of operations for scheduling the processing of objects, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, an object is stored in a data repository (Operation 204). Any techniques known today or later developed may be used for storing an object in a data repository. Any number of components may be involved in storing an object to a data repository. Storage of objects to a data repository is not limited to any specific techniques or components. As an example, which should not be construed to limit the scope of any of the embodiments, an object may be stored in data repository using a two-tier commit as described in a related patent application, titled "TWO-TIER STORAGE PROTOCOL FOR COMMITTING CHANGES IN A STORAGE SYSTEM", application Ser. No. 15/338,829 filed on 31 Oct. 2016 the entire contents of which are hereby incorporated by reference.

In an embodiment, a determination is made as to whether future processing of the object is to be scheduled (Operation 206). The object processing scheduler may make the determination based on any information associated with the object. The information associated with an object may include explicit instructions indicating when or how to process an object. Information indicating how and when to process an object may be split across different components or different publications. As an example, an OME associated with storage of an object in a primary storage tier may indicate that the object is to be moved out of a primary storage tier in three days. A policy, corresponding to a container which includes the object, may identify a secondary storage for transferring objects out of the primary storage. Alternatively, the policy may indicate that objects within a particular container may be deleted entirely from the storage system whenever the objects are transferred out of primary storage. As another example, a tenant policy may indicate that a policy for encrypted objects associated with the tenant. The policy may indicate that the objects are to be decrypted eighteen months subsequent to creation as stored as publicly available objects.

In an embodiment, the time at which an object is to be processed in the future is determined (Operation 208). The object processing scheduler may determine an exact time for processing the object or may determine an acceptable processing interval. A processing schedule may be used to determine multiple times in the future at which the object is to be processed. As an example, a synchronization schedule may indicate that the object is to be synchronized to cloud storage every day at midnight. In another example, a schedule may specify a first time (e.g., one week after creation) at which the object is to be moved from primary storage to secondary storage. The schedule may further specify a second time (e.g., one month after creation) at which the object is to be moved from the secondary storage to tertiary storage.

As an example, the object processing scheduler may determine an exact time for scheduling the processing of an object such as 5:15 pm on Oct. 20, 2017. The object processing scheduler may determine a time period for scheduling the processing of an object. As an example, the object processing scheduler may determine an open-ended time interval including any time after 5:15 pm on Oct. 20, 2017. The object processing may determine a fixed time interval from 5:15 pm to 5:30 pm.

In an embodiment, the object processing scheduler selects a time bucket generation for storing object reference to the object that is to be processed based on the time at which the object is to be processed. The object processing scheduler may select the time bucket generation from a set of time bucket generations that are currently configured for an object processing index (Operation 212). As an example, a storage system may be in a transition phase in which an old time bucket generation is being phased out and a new time bucket generation is being phased in. The object processing scheduler selects the new time bucket generation in response to determining that the new time bucket generation is the latest time bucket generation of the time bucket generations currently configured for the object processing index. The object processing scheduler may select a time bucket generation based on a type of the object to-be-processed. The object processing scheduler may select a time bucket generation based on a type of processing to be performed on the object. As an example, processing (e.g., modification) of objects to be maintained may be scheduled using a different time bucket generation than processing (e.g., deletion) of objects to be discarded. Processing of objects to be maintained may be scheduled using a time bucket generation that specifies one-hour intervals. In contrast, processing of objects to be discarded may be scheduled using a time bucket generation that specifies one-day intervals. The object processing scheduler may select a time bucket generation that is specified by a user or another component of the system.

In an embodiment, the object processing scheduler selects a particular time bucket corresponding to the selected time bucket generation (Operation 212). If an object is to be processed at an exact time (e.g., 4:34 am), then the object reference is stored within a time bucket corresponding to an interval (e.g., 4:30 am-5 am) that includes that exact time. If an object may be processed at any time after a particular time (e.g., 4:34 am), then the object reference may be stored within (a) a time bucket corresponding to an interval (e.g., 5 am-5:30 am) that begins after the particular time or (b) a time bucket (e.g., 4:30 am-5 am) which includes the particular time. If an object is to be processed during a particular period of time (e.g., 5 am to 7 am), then any time bucket with intervals (e.g., 5 am to 6 am or 6 am to 7 am) which overlap with the particular period of time may be selected.

In an embodiment, time buckets may be divided into partitions. If the time buckets are divided into partitions, then the object processing scheduler assigns an object reference, corresponding to an object to-be-processed, to one of the partitions in a selected time bucket. The object reference may be assigned to a partition of the selected time bucket based on an assignment algorithm specified for the corresponding time bucket generation (Operation 214). The assignment algorithm may be, for example, a hash algorithm which applies a hash function to the object to obtain a hash value. A partition may be selected based on the hash value. In another example, the assignment algorithm may include a round-robin algorithm in which each object reference is assigned to a different partition in a sequential order of partitions. Any assignment algorithm which may be utilized to assign object references to a partition of a selected time bucket. The object reference is stored in the assigned partition of the selected time bucket (Operation 216). Storing the object reference within an assigned partition may include storing the object reference within a region of physical memory allocated to the assigned partition. A partition does not necessarily correspond to a region of physical memory. For example, an assigned partition may simply correspond to a logical grouping associated with an identifier. The object reference is stored in memory with the identifier of the assigned partition.

4. Processing Objects Scheduled with any of Multiple Time Bucket Generations

Figure 3:
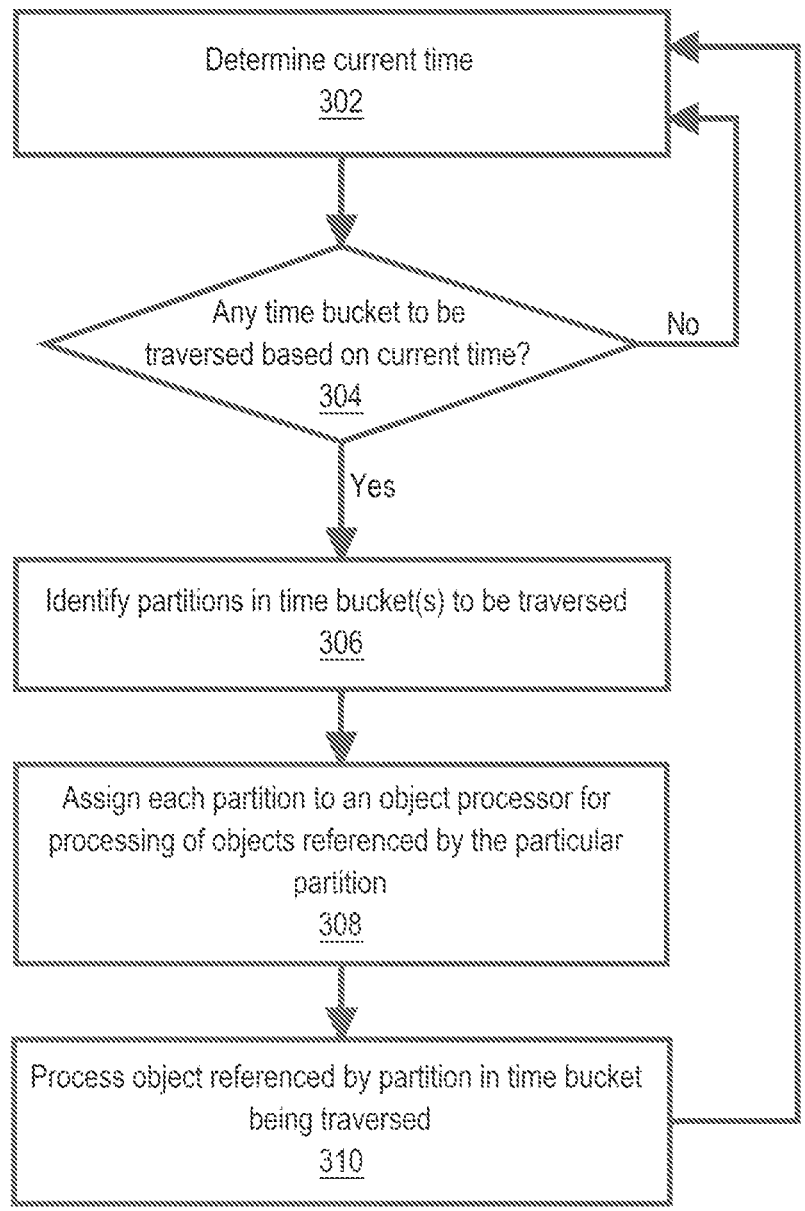
FIG. 3 illustrates operations for assigning objects, referenced by an object processing index, to an object processor.

FIG. 3 illustrates an example set of operations for processing objects, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, processing of objects is scheduled using an object processing index, as described above with reference to FIG. 2. Object references are stored in various time buckets corresponding to a time intervals during which the corresponding objects are to be processed.

In an embodiment, processing objects, in accordance with corresponding scheduled time intervals, includes determining a current time (Operation 302). The current time may be determined from a CPU clock, an Application Programming Interface (API), via execution of a query and/or other technique. The current time may be periodically determined. The current time may be compared to intervals corresponding to time buckets to determine if any time bucket is to be traversed based on the current time (Operation 304). In an embodiment, multiple time buckets may need to be traversed based on the current time. Specifically, the current time may correspond to multiple different time buckets associated respectively with different time bucket generations. As an example, a current time of 5:30 pm may be associated with a time bucket from 5:30 pm to 6 pm corresponding to a first time bucket generation defining half hour intervals. The current time of 5:30 pm may be associated with another time bucket from 5:30 pm to 6:30 pm corresponding to a second time bucket generation defining one hour intervals. At 5:30 pm, the objects referenced by either one of (a) the time bucket with the half hour interval from 5:30 pm to 6 pm or (b) the time bucket with the one hour interval from 5:30 pm to 6:30 pm are to be processed. A same object processor may traverse time buckets corresponding to different time bucket generations. Alternatively, different object processors may traverse time buckets corresponding to different time bucket generations.

In an embodiment, time buckets are divided into partitions as described above. The partitions, for a time bucket to be traversed, are identified for assignment to object processors (Operation 306). Each partition may be assigned to a respective object processor for processing of objects referenced by the partition (Operation 308). As an example, a partition may be assigned to an object processor based on a current load and/or current level of utilization associated with the object processor. An object processor with a smallest queue of a set of object processors may be selected for assignment of partitions.

While the assignment of an object processor to a partition is illustrated as a last step of FIG. 3, the assignment may be completed at any time. For example, each partition of a time bucket may be assigned to an object processor well in advance of the current time matching the interval corresponding to the time bucket. In at least one embodiment, multiple partitions may be assigned to a single object processor, however, multiple object processors may not be assigned to a single partition.

In an embodiment, an object processor processes objects referenced by a partition that is assigned to the object processor (Operation 310). The object processor identifies the object based on the object reference stored in the partition of the time bucket assigned to the object processor. The object processor executes operations for modifying, deleting, synchronizing, or otherwise affecting or related to the referenced objects.

In an embodiment, the object processor validates a time at which the object, referenced by an object reference, is to be processed, prior to processing the object. As an example, an object is initially configured for processing after 7:25 pm. Based on the initially configured processing time, a first object reference for the object is stored in a time bucket corresponding to the time interval from 7:30 pm to 8 pm. Furthermore, metadata associated with the object is updated to indicate that the object is to be processed after 7:25 pm. Subsequent to the addition of the first object reference, the configured for the object is modified. The modification to the configuration for the object specifies that the object is to be processed after 8:29 pm. Based on the modification, the metadata for the object is updated to indicate that the object is to be processed at 8:29 pm. Furthermore, a second object reference for the same object is added to another time bucket corresponding to a time interval from 8:30 pm to 9 pm. At 7:45 pm, an object processor traverses the time bucket corresponding to the interval from 7:30 pm to 8 pm. The object processor identifies the first object reference, for the object, in the time bucket corresponding to the interval from 7:30 pm to 8 pm. The object processor checks the metadata corresponding to the object to double check whether the object may be processed between 7:30 pm and 8 pm. Based on the updated metadata, the object processor determines that the object is to be processed after 8:29 pm, and not between 7:30 pm and 8 pm. Accordingly, the object processor refrains from processing the object at 7:45 pm. Thereafter, at 8:30 pm, the same (or different) object processor traverses the time bucket corresponding to the time interval 8:30 pm to 9 pm. The object processor identifies the second object reference, for the object, in the time bucket corresponding to the interval from 8:30 pm to 9 pm. The object processor checks the metadata corresponding to the object to double check whether the object may be processed between 8:30 pm and 9 pm. Based on the updated metadata, the object processor determines that the object is to be processed after 8:29 pm. The object processor determines that the object may be processed between 8:30 pm and 9 pm. Accordingly, the object processor proceeds with processing the object at 8:30 pm.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions, which when executed by one or more hardware processors, cause performance of operations comprising:

determining a time for performing an action on a first object stored in a data repository, wherein the action comprises one of:
       deleting the first object from the data repository,
       modifying content of the first object, or
       transferring the first object from one location in the repository to another location in the repository;
   selecting a first time bucket generation, of a plurality of time bucket generations, based on determining that the first time bucket generation is currently configured for adding a first reference to the first object;

responsive to selecting the first time bucket generation, selecting a first time bucket of the first time bucket generation based on the time for performing the action on the first object, wherein each time bucket of the first time bucket generation is (a) of a same interval size and (b) corresponds to different time periods;

adding the first reference to the first object to the selected first time bucket of the first time bucket generation;

creating a second time bucket generation and adding the second time bucket generation to the plurality of time bucket generations;

determining a time for performing an action on a second object stored in the data repository;

determining to transition adding new object references from the first time bucket generation to the second time bucket generation, wherein transitioning from the first time bucket generation to the second time bucket generation comprises performing operations on objects having references already stored in the first time generation bucket, and adding all new object references to the second time bucket generation instead of adding new object references to the first time bucket generation;

selecting a second time bucket of the second time bucket generation based on the time for performing the action on the second object;

adding a second reference to the second object into the second time bucket of the second time bucket generation, wherein the action is performed on the first object subsequent to adding the second object reference to the second object into the second time bucket generation.

2. The medium of claim 1, wherein the operations further comprise (a) a first object processor processing the first object corresponding to the reference stored in the selected time bucket of the first time bucket generation concurrent with (b) a second object processor processing the second object corresponding to a second referenced stored in a second time of a second time bucket generation.

3. The medium of claim 1, wherein the operations further comprise a same object processor concurrently processing (a) objects referenced by time buckets of the first time bucket generation and (b) objects references by time buckets of a second time bucket generation.

4. The medium of claim 1, wherein the respective interval size of time buckets, of the first time bucket generation and the second time bucket generation, are different.

5. The medium of claim 1, wherein determining to transition adding new object references from the first time bucket generation to the second time bucket generation comprises:

determining that the second time bucket generation was added to the plurality of time bucket generations after the first time bucket generation was added to the plurality of time bucket generations; and configuring the second time bucket generation to be the currently configured time bucket generation; for adding object references to objects on which an action is to be performed.

6. The medium of claim 1, wherein a first reference to the first time bucket generation and a second reference to the second time bucket generation are stored in an object processing index.

7. The medium of claim 1, wherein each time bucket generation, of the plurality of time bucket generations, corresponds to a respective assignment algorithm for assigning any object to a partition of an associated time bucket.

8. The medium of claim 7, wherein the respective assignment algorithm, of the first time bucket generation and the second time bucket generation, are different.

9. The medium of claim 1, wherein selecting the first time bucket generation is further based on the action to be performed on the first object.

10. A method comprising:

determining a time for performing an action on a first object stored in a data repository, wherein the action comprises one of:
  deleting the first object from the data repository,
  modifying content of the first object, or
  transferring the first object from one location in the repository to another location in the repository;

selecting a first time bucket generation, of a plurality of time bucket generations, based on determining that the first time bucket generation is currently configured for adding a first reference to the first object;

responsive to selecting the first time bucket generation, selecting a first time bucket of the first time bucket generation based on the time for performing the action on the first object, wherein each time bucket of the first time bucket generation is (a) of a same interval size and (b) corresponds to different time periods;

adding the first reference to the first object to the selected first time bucket of the first time bucket generation;

creating a second time bucket generation and adding the second time bucket generation to the plurality of time bucket generations;

determining a time for performing an action on a second object stored in the data repository;

determining to transition adding new object references from the first time bucket generation to the second time bucket generation, wherein transitioning from the first time bucket generation to the second time bucket generation comprises performing operations on objects having references already stored in the first time generation bucket, and adding all new object references to the second time bucket generation instead of adding new object references to the first time bucket generation;

selecting a second time bucket of the second time bucket generation based on the time for performing the action on the second object;

adding a second reference to the second object into the second time bucket of the second time bucket generation, wherein the action is performed on the first object subsequent to adding the second object reference to the second object into the second time bucket generation.

11. The method of claim 10, the method further comprising:

(a) a first object processor processing the first object corresponding to the reference stored in the selected time bucket of the first time bucket generation concurrent with (b) a second object processor processing the second object corresponding to a second referenced stored in a second time of a second time bucket generation.

12. The method of claim 10, the method further comprising:

processing (a) objects referenced by time buckets of the first time bucket generation and (b) objects references by time buckets of a second time bucket generation, wherein the processing objects referenced by time buckets of the first time bucket generation and objects references by time buckets of a second time bucket generation is performed concurrently by the same object processor.

13. The method of claim 10, wherein the respective interval size of time buckets, of the first time bucket generation and the second time bucket generation, are different.

14. The method of claim 10, wherein determining to transition adding new object references from the first time bucket generation to the second time bucket generation comprises:
    determining that the second time bucket generation was added to the plurality of time bucket generations after the first time bucket generation was added to the plurality of time bucket generations; and
    configuring the second time bucket generation to be the currently configured time bucket generation; for adding object references to objects on which an action is to be performed.

15. The method of claim 10, wherein a first reference to the first time bucket generation and a second reference to the second time bucket generation are stored in an object processing index.

16. The method of claim 10, wherein each time bucket generation, of the plurality of time bucket generations, corresponds to a respective assignment algorithm for assigning any object to a partition of an associated time bucket.

17. The method of claim 16, wherein the respective assignment algorithm, of the first time bucket generation and the second time bucket generation, are different.

18. The method of claim 10, wherein selecting the first time bucket generation is further based on the action to be performed on the first object.

19. A system comprising at least one device including a hardware processor,
    the system being configured to perform operations comprising:
        determining a time for performing an action on a first object stored in a data repository, wherein the action comprises one of:
            deleting the first object from the data repository,
            modifying content of the first object, or
            transferring the first object from one location in the repository to another location in the repository;
        selecting a first time bucket generation, of a plurality of time bucket generations, based on determining that the first time bucket generation is currently configured for adding a first reference to the first object;
        responsive to selecting the first time bucket generation, selecting a first time bucket of the first time bucket generation based on the time for performing the action on the first object, wherein each time bucket of the first time bucket generation is (a) of a same interval size and (b) corresponds to different time periods;
        adding the first reference to the first object to the selected first time bucket of the first time bucket generation;
        creating a second time bucket generation and adding the second time bucket generation to the plurality of time bucket generations;
        determining a time for performing an action on a second object stored in the data repository;
        determining to transition adding new object references from the first time bucket generation to the second time bucket generation, wherein transitioning from the first time bucket generation to the second time bucket generation comprises performing operations on objects having references already stored in the first time generation bucket, and adding all new object references to the second time bucket generation instead of adding new object references to the first time bucket generation;
        selecting a second time bucket of the second time bucket generation based on the time for performing the action on the second object;
        adding a second reference to the second object into the second time bucket of the second time bucket generation,
        wherein the action is performed on the first object subsequent to adding the second object reference to the second object into the second time bucket generation.

* * * * *